United States Patent [19]

Bitjurin et al.

[11] 4,260,913
[45] Apr. 7, 1981

[54] DUCT FOR MAGNETOHYDRODYNAMIC GENERATOR

[76] Inventors: Valentin A. Bitjurin, ulitsa Krupskoi, 3, kv. 16; Vladilen I. Maximenko, Posledny pereulok, 23, kv. 15; Stanislav A. Medin, Leningradsky prospekt, 78, korpus 5, kv. 83, all of Moscow, U.S.S.R.

[21] Appl. No.: 58,792

[22] Filed: Jul. 18, 1979

[30] Foreign Application Priority Data

Jul. 18, 1978 [SU] U.S.S.R. .............................. 2645820

[51] Int. Cl.³ .............................................. H02K 45/00
[52] U.S. Cl. ................................................. 310/11
[58] Field of Search ........................................ 310/11

[56] References Cited

U.S. PATENT DOCUMENTS

| | | | |
|---|---|---|---|
| 3,387,150 | 6/1968 | Powers, Jr. et al. | 310/11 |
| 3,465,179 | 9/1969 | Ricafeau | 310/11 |

*Primary Examiner*—Donovan F. Duggan
*Attorney, Agent, or Firm*—Lackenbach, Lilling & Siegel

[57] ABSTRACT

A duct for a magnetohydrodynamic generator having diagonally conductive walls formed with extended modules of a suitable electrically conductive material, which are electrically insulated from one another and oriented so that each module has sections inclined at an angle with respect to the longitudinal axis of the duct, said angle being varied within $\pi/2 \geq \alpha_{max} \geq \alpha \geq \alpha_{min} \geq 0$. The extended modules are C-shaped and oppositely disposed in an alternating manner so that the number of electrical breaks per unit length of the duct along its axis on the walls formed with sections of the modules inclined at the angle $\alpha_{max}$ with respect to the duct axis exceeds twice the number of electrical breaks along the duct axis on the walls formed with sections of the modules inclined at the angle $\alpha_{min}$ with respect to the duct axis.

3 Claims, 6 Drawing Figures

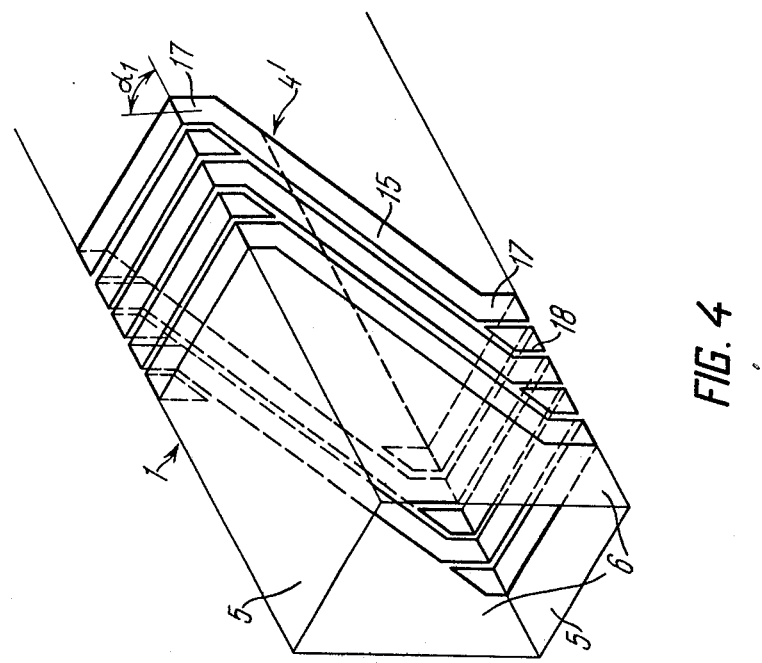
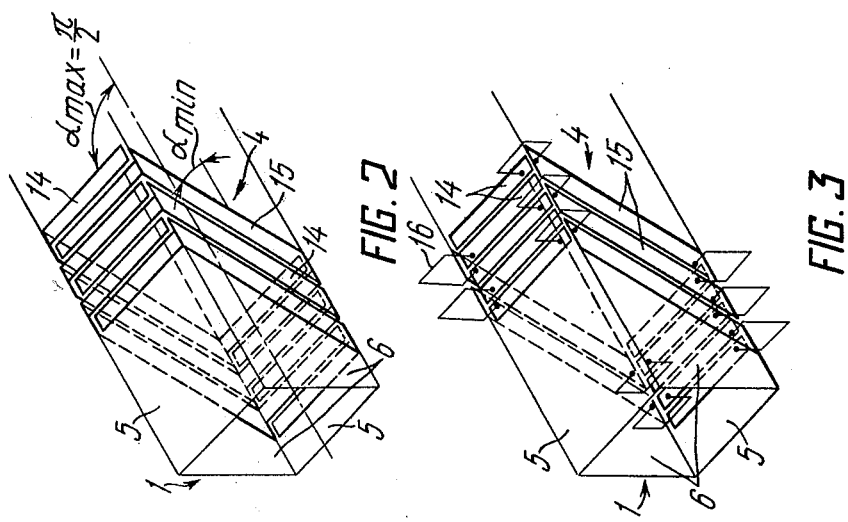

DUCT FOR MAGNETOHYDRODYNAMIC GENERATOR

FIELD OF THE INVENTION

This invention relates to a magnetohydrodynamic method of energy conversion and in particular to ducts for magnetohydrodynamic (MHD) generators having diagonally conductive walls.

DESCRIPTION OF THE PRIOR ART

Known in the art is a duct for a magnetohydrodynamic generator having diagonally conductive walls formed with extended modules of an electrically conductive material, which are insulated from one another (cf. U.S. Pat. No. 3,387,150).

In the known duct the extended modules are oriented with respect to the longitudiinal axis of the duct so that each module has sections inclined at an angle $\alpha$ with respect to the longitudinal axis of the duct, said angle being varied within $\pi/2 \geq \alpha_{max} \geq \alpha \geq \alpha_{min} \geq 0$.

The working section of the duct comprises flat diagonal frames (extended modules) milled from metal plates wherein grooves are drilled along the frame sides to enable passage of cooling water. In such a duct the angle $\alpha$ between the duct axis and the tangent to the frame reaches its maximum value $\alpha_{max} = \pi/2$ on the electrode walls of the duct, i.e., on the walls whose generating lines are directed along the vector of an external magnetic field and perpendicular to the duct axis. The minimum angle value $\alpha = \alpha_{min}$ is obtained on the side walls of the duct, the generating lines of which are perpendicular to the duct axis and the vector of the external magnetic field, the angle $\alpha_{min}$ being equal to an equipotential (diagonal) surface inclination angle when the side walls are parallel to each other.

Adjacent the working section in the end parts are equipotential adapter elements located on the side of the entrance and exit sections of the MHD generator duct.

This simple solution facilitating assembly and servicing of the known duct for a MHD generator provides for its reliable and effective operation within a predetermined range of operating characteristics. The main advantage facilitating assembly and servicing of such a frame duct resides in its constructional simplicity, a feature attributed to the fact that the duct includes a minimum number of equipotential elements individually cooled with water. This also enhances the constructional reliability.

However, the aforesaid frame duct has been generally unsatisfactory due to its low effectiveness associated with the fact that the sectionalization degree of the duct is limited, i.e., a limitation is imposed on the number of electrical breaks along the longitudinal axial section of the wall per unit length measured along the duct axis. The sectionalization pitch is determined by the thickness of the frame (in the direction normal to the plane thereof), the thickness value being dictated by the requirements for adequate cooling and constructional strength. The minimum permissible sectionalization pitch limits the operating voltage of the duct since, in MHD generators using products of combustion of organic fuels, stringent requirements are imposed on the maximum permissible electrode voltages. When the allowable limits of such voltages are exceeded, an electrode breakdown occurs, which degrades the output characteristics of the duct and causes arc erosion of the electrodes and the electrode isolating gaps.

This is particularly true for small angles of inclination of the frames with respect to the duct axis. Such angles are essential to ensure high efficiency of industrial generators or adequate effectiveness of generators wherein the Hall parameter value is negligible. In this case, considering the geometrical relationships between various structural elements even with a small thickness of the frame, the sectionalization pitch of the duct along its axis (equal for sections wherein $\alpha = \alpha_{max}$ and $\alpha = \alpha_{min}$) may be rather great. Considerable difficulties are, therefore, involved in cooling the electrode walls perpendicular to the side walls. With small angles of frame inclination, a specific surface of the electrode wall per unit length of the cooling groove may appreciably exceed a specific surface of the side diagonal wall. Thus, one cooling groove in the electrode wall may be insufficient to remove the total heat flows. The provision for several cooling grooves in the electrode sections of the frame (inclined at the angle $\alpha_{max}$ with respect to the duct axis) would, however, hinder assembly and servicing of such a frame structure.

BRIEF DESCRIPTION OF THE INVENTION

It is an object of the present invention to increase the sectionalization degree of a duct for a MHD generator, thereby enhancing its effectiveness.

Another object of the invention is to increase reliability of the MHD generator.

The above objects are accomplished by a duct for a MHD generator having diagonally conductive walls formed with extended modules of a suitable electrically conductive material which are electrically insulated from one another and oriented so that each module has sections inclined at an angle $\alpha$ with respect to the longitudinal axis of the duct, the angle varying within $\pi/2 \geq \alpha_{max} \geq \alpha \geq \alpha_{max} \geq 0$. According to the invention, the extended modules are C-shaped and oppositely disposed in an alternating manner so that the number of electrical breaks per unit length of the duct along its axis on walls formed with sections of the modules inclined at the angle $\alpha_{max}$ with respect to the duct axis exceeds twice the number of electrical breaks along the duct axis on walls formed with sections of modules inclined at the angle $\alpha_{min}$ with respect to the duct axis.

To facilitate assembly and servicing of the novel structure, the C-shaped modules preferably comprise electrically interconnected elements insulated from one another.

It is advantageous that sections of the modules inclined at the angle $\alpha_{min}$ with respect to the duct axis have bent ends with an angle $\alpha_1$ of inclination thereof with respect to the duct axis being within arc sin ($2 \sin \alpha_{min}$)$\leq \alpha_1 < \pi/2$ at $0 \leq \alpha_{min} < \pi/6$ and $\alpha_1 = \pi/2$ at $\pi/6 \leq \alpha_{min} \leq \pi/6$.

The duct for a MHD generator forming the subject of the present invention features an increased sectionalization degree of electrode walls, an advantage increasing permissible values of a longitudinal electrical field in the duct and, consequently, effectiveness of the duct.

Furthermore, a decrease (due to an enhanced sectionalization degree) of the surface area of the extended module facing the inside of the duct results in a decrease of the total current supplied to the element from the working volume of the duct, a feature enhancing reliability of the duct.

BRIEF DESCRIPTION OF THE DRAWINGS

The invention will be further described with reference to specific embodiments thereof, taken in conjunction with the accompanying drawings, wherein:

FIG. 2 is a diagrammatical view of the duct for a MHD generator comprising C-shaped modules according to the invention;

FIG. 3 shows the duct of FIG. 2 with modules comprising externally switched separate elements according to the invention;

FIG. 4 is a diagrammatical view of the duct for a MHD generator comprising extended C-shaped modules having bent ends according to the invention.

DETAILED DESCRIPTION OF THE INVENTION

Figure 1:
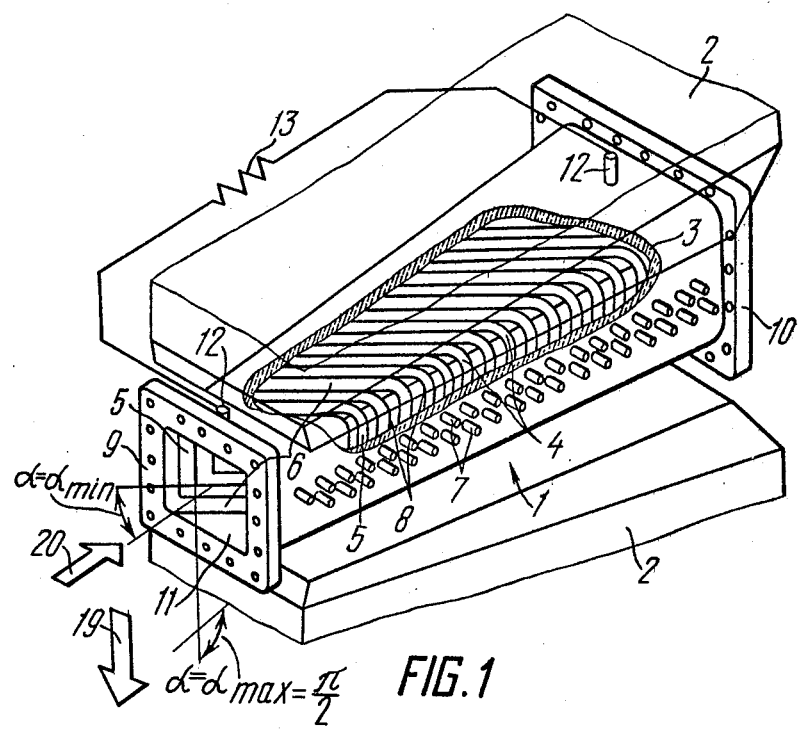
FIG. 1 is an isometric view of a duct for a MHD generator according to the invention.

A duct 1 of a MHD generator shown in FIG. 1 is designed to convey a high-velocity electrically conductive gas flow through a transversal magnetic field set up by a magnetic system. FIG. 1 shows only poles 2 of the magnetic system (thin lines). The duct 1 comprises a glass textolyte enclosure 3 accommodating C-shaped modules 4 oppositely disposed in an alternating manner so that the sectionalization degree of an electrode wall 5 of the duct 1 exceeds that of a side wall 6. Different sections of the extended modules 4 are oriented with respect to the longitudinal axis of the duct 1 at an angle $\alpha$ varying within $0 \leq \alpha_{min} \leq \alpha \leq \alpha_{max} \leq \pi/2$. The angle $\alpha$ is minimum ($\alpha_{min}$) on the side (diagonal) walls 6 and maximum ($\alpha_{max} = \pi/2$) on the electrode walls 5. The minimum angle value $\alpha_{min}$ is determined by the rated operating conditions of the MHD generator and the gas flow parameters. The angles $\alpha_{min}$ of orientation of the extended modules 4 on the side (diagonal) wall 6 with respect to the longitudinal axis of the duct 1 are within 20°-60° under standard operating conditions of the MHD generator wherein products of combustion of fossil fuel in the air with an alkaline-metal additive, such as K, Cs and the like, are used as a working substance.

The extended modules 4 are fabricated from a highly conductive material, such as, for example, copper, and may have internal openings to pass a coolant (for example, water). Connections 7 are used to supply the coolant to the extended modules 4 and remove it therefrom. The extended modules 4 are insulated from one another by means of insulation 8 such as thick high-temperature ceramics.

At its entrance and exit the duct 1 has flanges 9 and 10 which mechanically couple the duct 1 to the adjacent elements of the MHD generator structure: a nozzle at the entrance and a diffuser at the exit (not shown in FIG. 1).

Located within the entrance and exit sections of the duct 1 are current-collecting adapter elements 11 which electrically couple the regular sectionalized part of the duct 1 formed with the extended modules 4 to such adjacent elements of the MHD generator structure as the nozzle and diffuser. The elements 11 are provided with current leads 12 to which a main load 13 is connected. The connections 7 of the extended modules 4 may also act as current leads for connecting an electrical load (not shown in FIG. 1) directly to the extended modules 4.

FIG. 2 shows diagrammatically the duct 1 for a MHD generator of FIG. 1 comprising C-shaped extended modules 4. Each extended module 4 consists of two sections 14 oriented at an angle $\alpha = \alpha_{max} = \pi/2$ with respect to the longitudinal axis of the duct and constituting parts of the electrode walls 5 and one section 15 arranged between the sections 14, oriented at an angle $\alpha_{min}$ with respect to the longitudinal axis of the duct and constituting part of one of the side walls 6 (diagonally conductive walls).

Each extended module 4 encompasses the working volume of the duct 1 on three sides. The extended C-shaped modules 4 are oppositely disposed with the sections 14 facing each other along the longitudinal axis of the duct 1 in an alternating manner so that the number of electrical breaks (sectionalization degree) along the longitudinal axis of the duct 1 on the electrode walls 5 exceeds twice the number of electrical breaks along the longitudinal axis of the duct on the side (diagonal) walls 6. An insulating material (not shown in FIG. 2) such as, for example, high-temperature ceramics, is interposed between the extended modules 4.

FIG. 3 shows diagrammatically the same duct 1 wherein the extended C-shaped modules 4 are constructed in a different manner according to the invention. In this embodiment of the invention the sections 14 and 15 comprised in each extended module 4 represent separate elements (hereinafter referred to as elements 14 and 15) insulated and switched with respect to one another by means of external jumpers 16.

In a simple case the jumpers 16 may comprise a shorting element making all the sections 14 and 15 of the extended module 4 equipotential. The jumpers 16 may also represent an electrical or other device allowing passage of current from the sections 14 to the sections 15 of the extended C-shaped module 4 and when the sections 14 and 15 have a different potential.

Such a construction of the modules 4 noticeably facilitates servicing and fabrication of the duct 1.

The solution illustrated in FIG. 3 permits fabrication of the duct 1 comprising separate walls (two electrode walls 5 and two side diagonal walls 6). With this arrangement, all the conductive elements of the walls 5 and 6 are individually cooled. The jumpers 16 may contain tubes to pass the coolant successively through the elements of the C-shaped module 4 from one cooling collector. An advantage facilitating assembly and servicing operations is that the construction of the elements 14 representing electrodes is substantially simplified, this being due to the fact that, in the preferred embodiment of the invention, the elements 14 comprise shaped members or plates having a rectangular section and have no hard-to-cool sharp edges which are found in a convention frame duct, for example, in the prototype of the present invention. The provision of four separate walls in the duct 1 substantially increases its repairability and reduces to a large extent the scope of in-service repair operations.

Figure 5:
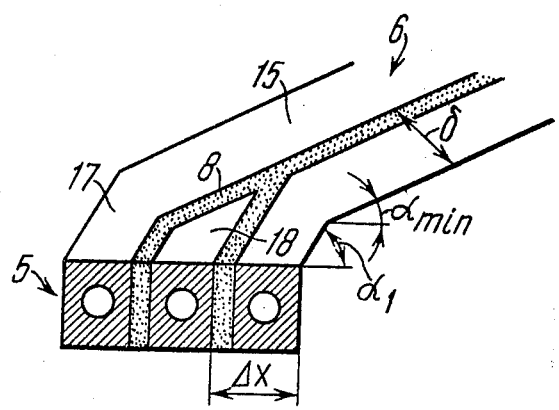
FIGS. 5 and 6 show embodiments of bent ends of the extended modules according to the invention.
Figure 6:
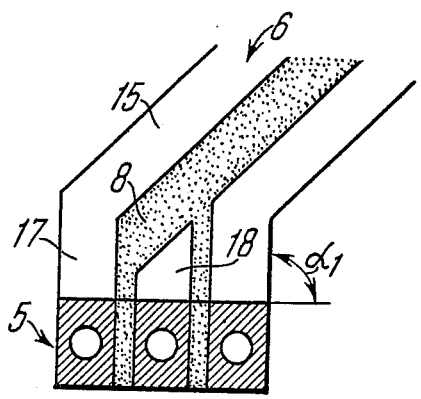

FIGS. 4, 5 and 6 show diagrammatically the duct 1 wherein the extended C-shaped modules 4' are constructed in still a different manner according to the invention. In this embodiment of the invention, the diagonal elements 15 constituting the side (diagonal) walls 6 comprise ends 17 bent towards the electrode walls 5 at an angle $\alpha_1$ with respect to the duct axis. Conductive elements 18 are arranged in the sections of the side walls 6 free from the elements 15 having the bent ends 17.

The use of the modules 4' having the bent ends 17 is advantageous in that, with appropriately chosen angles $\alpha_1$ of inclination of the ends 17 (as hereinafter described), all the conductive elements (14, 15, 17 and 18) may employ shaped members or plates having a uniform width (in the plane of the respective walls).

The angle $\alpha_1$ of inclination of the bent end 17 of the element 15 with respect to the electrode wall 5 depends on the angle $\alpha_{min}$ of inclination of the element 15 with respect to said wall 5. Two cases will be considered below in view of the existing geometrical relationships. The first case corresponds to small values of the angles $\alpha_{min}$ of inclination of the mid portion of the element 15 within $0 \leq \alpha_{min} < \pi/6$. In this case the minimum sectionalization pitch of the electrode wall 5 along the axis of the duct 1 is determined by the minimum permissible width of the element 15 and the angle $\alpha_{min}$ of its inclination with respect to the axis of the duct 1.

FIG. 5 shows diagrammatically the construction of a section of the walls 5 and 6 of the MHD generator according to the invention. A minimum sectionalization pitch $\Delta x$ is interrelated with a sectionalization pitch $\delta$ of the wall 6 in the midportion thereof by the following relationship:

$$\Delta x = \delta/2 \sin \alpha_{min}$$

With the thickness of the element 15 being constant, this pitch is provided by bending the end 17 thereof towards the wall 5 at the angle $\alpha_1$ equalling $$\alpha_1 = \arcsin (2 \sin \alpha_{min})$$

This equation determines the minimum value of the angle $\alpha_1$.

In the general case the value of the angle $\alpha_1$ may vary within $\arcsin (2 \sin \alpha_{min}) \leq \alpha_1 < \pi/2$ and at $\alpha_1 > \arcsin (2 \sin \alpha_{min})$ the use of the contant-thickness element 15 results in more insulation 8 in the area surrounding the bent end 17. The width of the insulation 8 in said area may be decreased by providing the thicker bent end 17 of the element 15 and the element 14.

It follows from the expression for $\alpha_1$ that at $\alpha_{min} = \pi/6$ $\alpha_1 = \pi/2$, i.e., the end 17 of the element 15 should be bent at right angles relative to the duct axis in the direction of the wall 5.

The expression for $\alpha_1$ is meaningless at angles $\alpha_{min} > \pi/6$.

The construction of the walls 5 and 6 illustrated in FIG. 6 is applicable to the case when the value $\alpha_{min}$ varies within $\pi/6 \leq \alpha_{min} \leq \pi/2$.

In the preferred embodiment of the invention the elements 14 and 15 have a constant and uniform thickness. In this case, the angle $\alpha_1$ of inclination of the ends 17 of the elements 15 equals $\pi/2$ regardless of the value $\alpha_{min}$. It is apparent that the sectionalization pitch of the walls 5 along the duct axis is minimum and the insulation 8 in the area surrounding the midportion of the element 15 is to exceed that in the area surrounding the end 17 when the elements 14 and 15 of the walls 5 and 6 have a constant thickness. Similarly to the previous case the width of the insulation 8 may be decreased by providing a thicker midportion of the element 15.

Hence, the inclination angle of the bent end 17 is interrelated with the angle $\alpha_1$ of inclination of the element 15 as follows:

$\arcsin (2 \sin \alpha_{min}) \leq \alpha_1 < \pi/2$ at $0 \leq \alpha_{min} < \pi/6$ and
$\alpha_1 = \pi/2$ at $\pi/6 \leq \alpha_{min} \leq \pi/2$.

In the duct for a MHD generator forming the subject of the present invention the current flow and potential distribution in a plasma flow are essentially similar to those of conventional diagonal MHD generators. The bending of the ends 17 of the elements 15 in the direction of the walls 5 corresponds to optimum configuration of the frame, which for frame ducts is chosen during the output power maximization process.

An additional advantage facilitating assembly and servicing operations is that, similarly to the embodiment of FIG. 3, the elements 14 of the electrode wall 5 have a rectangular cross-section when the ends 17 of the elements 15 are bent at right angles to the electrode wall 5.

The duct forming the subject of the present invention operates in the following manner.

The duct is placed in a magnetic field B whose direction is shown with arrow 19 in FIG. 1. An electrically conductive gas is then passed through the duct in the direction of arrow 20 at a speed of $\vec{U}$. An electromotive force $\vec{U} \times \vec{B}$ is set up in said flow. Under the action of this electromotive force, a current whose sense is dependent upon the value of the load 13 connected to the duct 1 will flow through the duct 1. The duct 1 is loaded similarly to any known diagonal channel. For example, the load 13 may be connected to the entrance and exit of the duct 1. When the load applied to the duct is optimum, a midsection longitudinal (Hall) current in the active section thereof is zero and an operating current flows in the main direction of the electromotive force $\vec{U} \times \vec{B}$, i.e., between the electrode walls 5—5. The presence of nonuniformm conductivity in the cross-section of the duct 1 manifesting itself in the wall boundary areas leads to the fact that a portion of the operating current is applied to the side (diagonal) walls 6. It is common knowledge that such an effect improves the performance of the frame MHD generator as compared to the Faraday effect and the ratio of currents applied to the side conductive walls 6 and the electrode walls 5 depends on specific flow conditions (thickness of a boundary layer, wall temperature, Hall field, etc.).

Inasmuch as the hereinproposed duct comprises the C-shaped extended modules, the current coming to the lower element 14 (cathode) and the adjacent areas of the diagonal element 15 flows upwards through the diagonal element 15 and returns to the flow from the current element 14 (anode). Thus, the operating current is allowed to flow from the entrance of the duct 1 to its exit, thereby ensuring the operation of the hereinproposed duct having diagonally conductive walls.

It should be noted that in the duct forming the subject of the present invention current flow and potential distribution in a plasma flow are essentially similar to those of conventional diagonal ducts.

In the hereinproposed duct the sectionalization pitch of the electrode wall 5 is reduced twice as compared to the prior art. The voltage and current applied to the element 14 of the electrode wall 5 decrease accordingly. Assuming that the output voltage in the known duct and applicants' duct is the same, reliability of the duct of this invention will be substantially enhanced. On the other hand, with equal voltages applied between the elements 14 of the electrode wall 5, the output voltage across the load 13 will increase in the preferred embodiment of the invention. However, this is accompanied by increasing voltage between the diagonal elements 15, which increases the probability of a breakdown between the diagonal elements 15 if said components are combined with the elements 14 of the electrode wall 5 receiving an appreciable portion of the operating current from the plasma.

Despite this, the duct forming the subject of the present invention positively provides the possibility of increasing an output voltage as compared to the prior art ducts having diagonally conductive walls. The same operational reliability will thus be ensured. This is explained by the fact that an arc breakdown sharply decreasing reliability of the duct is maintained between the current carrying elements with voltages whose magnitude is inversely proportional to the current applied to said elements within a predetermined range. Since at specific values of the Hall parameter (on the order of or less than several units), the current fed to the side wall 6 of the duct 1 of the MHD generator is normally smaller than the current fed to the electrode wall 5, the maximum permissible voltage between the diagonal elements 15 exceeds that applied to the elements 14 of the wall 5.

In view of this, operational reliability of the hereinproposed duct is ensured at increased intermodular and, correspondingly, output voltages whose magnitudes are determined by the flow parameters and construction of the duct.

In the duct comprising the extended C-shaped modules 4 with one cooling-water groove, the intensity of cooling of the electrode walls increases twice as compared to the prior art frame ducts.

The duct of FIGS. 4, 5 and 6 operates in much the same manner as the ducts of FIGS. 2 and 3.

The proposed solution is applicable not only to ducts of MHD generators having a rectangular section, as in FIGS. 2 through 4, but also to generators having any geometry of the cross-section (round, elliptical, oval, polygonal, etc.).

The proposed solution suits various configurations of the elements of the walls 5 and 6 (FIGS. 2 through 4). For example, the elements 14 and 15 may be of curved nonrectilinear shape. The end sections of the duct including intrically shaped modules may also comprise C-shaped modules.

The construction of the C-shaped modules may vary in specific instances. For example, such modules may represent round tubes, variable-section shaped members, etc. It should also be noted that the transision from the angle $\alpha_{min}$ of inclination of the midportion of the element 15 to the angle $\alpha_1$ of inclination of the element 17 at the point of connection with the electrode wall 5 may be accomplished along a broken line having one or several broken portions or along a line free of broken portions and having a variable curviture radius.

What is claimed is:

1. A duct for a magnetohydrodynamic generator having diagonally conductive walls, comprising extended modules of a suitable electrically conductive material, which are electrically insulated from one another and oriented so that each module has sections inclined at an angle $\alpha$ with respect to a longitudinal axis of said duct, said angle being varied within $\pi/2 \geq \alpha_{max} \geq \alpha \geq \alpha_{min} \geq 0$, said extended modules being C-shaped and oppositely disposed in an alternating manner so that the number of electrical breaks per unit length of said duct along its axis on walls formed with said sections of the modules inclined at said angle $\alpha_{max}$ with respect to said axis of duct exceeds twice the number of electrical breaks along its axis on walls formed with said sections of the modules inclined at said angle $\alpha_{min}$ with respect to said axis of the duct.

2. A duct for a magnetohydrodynamic generator as claimed in claim 1, wherein said C-shaped modules comprise electrically interconnected elements insulated from one another.

3. A duct for a magnetohydrodynamic generator as claimed in claim 1, wherein said sections of the modules inclined at said angle $\alpha_{min}$ with respect to said axis of the duct are provided with bent ends, an angle $\alpha_1$ of inclination thereof with respect to said axis of the duct being within arcsin $(2 \sin \alpha_{min}) \leq \alpha_1 \leq \pi/2$ at $0 \leq \alpha_{min} < \pi/2$ and $\alpha_1 = \pi/6$ at $\pi/6 \leq \alpha_{min} \leq \pi/2$.

* * * * *